US012658105B2

(12) United States Patent
Wu et al.

(10) Patent No.: US 12,658,105 B2
(45) Date of Patent: Jun. 16, 2026

(54) PIXEL DRIVING CIRCUIT INCLUDING DRIVE TRANSISTOR CAPABLE OF GENERATING DRIVE CURRENT INDEPENDENT OF THRESHOLD VOLTAGE THEREOF DRIVING METHOD THEREBY, AND DISPLAY PANEL

(71) Applicant: Shenzhen China Star Optoelectronics Semiconductor Display Technology Co., Ltd., Shenzhen (CN)

(72) Inventors: Yi Wu, Shenzhen (CN); Chenglei Nie, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/496,894

(22) Filed: Oct. 29, 2023

(65) Prior Publication Data

US 2024/0212583 A1 Jun. 27, 2024

(30) Foreign Application Priority Data

Dec. 27, 2022 (CN) ......................... 202211690351.0

(51) Int. Cl.
*G09G 3/32* (2016.01)

(52) U.S. Cl.
CPC ....... *G09G 3/32* (2013.01); *G09G 2300/0426* (2013.01); *G09G 2300/0871* (2013.01);
(Continued)

(58) Field of Classification Search
CPC ........................................................ G09G 3/32
See application file for complete search history.

(56) References Cited

U.S. PATENT DOCUMENTS

2005/0237281 A1* 10/2005 Tam ..................... G09G 3/3233 345/76
2009/0309516 A1* 12/2009 Kim ..................... G09G 3/3233 315/307
(Continued)

FOREIGN PATENT DOCUMENTS

CN 104867442 A 8/2015
CN 106887207 A 6/2017
(Continued)

OTHER PUBLICATIONS

Chinese Office Action issued in corresponding Chinese Patent Application No. 202211690351.0 dated May 31, 2024, pp. 1-8.
(Continued)

*Primary Examiner* — William Boddie
*Assistant Examiner* — Andrew B Schnirel
(74) *Attorney, Agent, or Firm* — PV IP PC; Christopher S. Ruprecht; Wei Te Chung

(57) ABSTRACT

A pixel driving circuit, a driving method of the pixel driving circuit, and a display panel are disclosed. The pixel driving circuit includes a first transistor having a first electrode electrically connected to a first voltage terminal, having a second electrode electrically connected to an anode of a light-emitting device and electrically connected to a second voltage terminal via the light-emitting device; a second transistor having a source and a drain electrically connected between a data line and the second electrode of the first transistor; and a third transistor having a source and a drain electrically connected between a gate of the first transistor and the first electrode of the first transistor.

6 Claims, 5 Drawing Sheets

(52) U.S. Cl.
CPC ............... *G09G 2310/0245* (2013.01); *G09G 2310/0264* (2013.01)

(56) References Cited

U.S. PATENT DOCUMENTS

| | | | | |
|---|---|---|---|---|
| 2013/0088165 | A1* | 4/2013 | Wang | H05B 45/60 315/240 |
| 2016/0063921 | A1* | 3/2016 | Tsai | G09G 3/3233 345/76 |
| 2018/0366062 | A1* | 12/2018 | Kim | G09G 3/3233 |
| 2020/0043410 | A1* | 2/2020 | Ka | G09G 3/3233 |

FOREIGN PATENT DOCUMENTS

| | | | |
|---|---|---|---|
| CN | 109754757 | A | 5/2019 |
| CN | 111179855 | A | 5/2020 |

OTHER PUBLICATIONS

Chinese Office Action issued in corresponding Chinese Patent Application No. 202211690351.0 dated Jan. 10, 2025, pp. 1-10.

* cited by examiner

PIXEL DRIVING CIRCUIT INCLUDING DRIVE TRANSISTOR CAPABLE OF GENERATING DRIVE CURRENT INDEPENDENT OF THRESHOLD VOLTAGE THEREOF DRIVING METHOD THEREBY, AND DISPLAY PANEL

CROSS-REFERENCE TO RELATED APPLICATION

This application claims the priority to Chinese Application No. 202211690351.0, filed on Dec. 27, 2022, the contents of which are incorporated herein by reference in their entirety.

FIELD

The present disclosure generally relates to the field of display technology, and in particular to a pixel driving circuit, a driving method of the pixel driving circuit, and a display panel.

BACKGROUND

A transistor for generating a driving current to drive a light-emitting device to emit light in a pixel driving circuit will change in the threshold voltage under the influence of a bias voltage, a temperature, illumination, and the like over a long time, whereby the driving current is affected, thereby causing a brightness change of the light-emitting device.

SUMMARY

According to an embodiment of the present disclosure, a pixel driving circuit includes a first transistor having a first electrode electrically connected to a first voltage terminal, having a second electrode electrically connected to an anode of a light-emitting device and electrically connected to a second voltage terminal via the light-emitting device; a second transistor having a source and a drain electrically connected between a data line and the second electrode of the first transistor; and a third transistor having a source and a drain electrically connected between a gate of the first transistor and the first electrode of the first transistor.

According to the present disclosure, it is provided a driving method of a pixel driving circuit, applied to the above-described pixel driving circuit. The driving method includes in a reset phase, transmitting, by the second transistor, the reset signal to the anode of the light-emitting device according to the scan signal to reset a potential of an anode of the light-emitting device; and transmitting, by the third transistor, a first voltage signal transmitted by the first voltage terminal to the gate of the first transistor according to the scan signal to reset a potential of a gate of the first transistor; in a compensation phase, transmitting, by the second transistor, the data signal to the second electrode of the first transistor according to the scan signal, and transmitting, by the third transistor, the data signal to the gate of the first transistor according to the scan signal; and in a light-emitting phase, generating, by the first transistor, according to the data signal, a driving current for driving the light-emitting device to emit light.

According to the present disclosure, it is provided a display panel including multiple pixel driving circuits and multiple light-emitting devices. At least one of the multiple pixel driving circuits includes a first transistor, a second transistor, a third transistor, a fourth transistor, a fifth transistor, and a first capacitor. A first electrode of the first transistor is electrically connected to the first voltage terminal. A second electrode of the first transistor is electrically connected to an anode of the light-emitting device and electrically connected to a second voltage terminal via the light-emitting device. A source and a drain of the second transistor are electrically connected between a data line and the second electrode of the first transistor. A source and a drain of the third transistor are electrically connected between a gate of the first transistor and the first electrode of the first transistor. The gate of the second transistor and the gate of the third transistor are both electrically connected to a scanning line. A source and a drain of the fourth transistor are electrically connected between the light-emitting device and the second electrode of the first transistor. A source and a drain of the fifth transistor are electrically connected between the first voltage terminal and the first electrode of the first transistor. The gate of the fourth transistor and the gate of the fifth transistor are both electrically connected to a light-emitting control line. The first capacitor is connected in series between the gate of the first transistor and the light-emitting device.

DESCRIPTION OF DRAWINGS

In order to describe the technical solution in some embodiments of the present disclosure more clearly, the accompanying drawings required in the description of the embodiments will be briefly introduced below. It will be apparent that the accompanying drawings in the description below are merely some embodiments of the present disclosure. For those skilled in the art, other accompanying drawings may be obtained based on these accompanying drawings without involving any inventive effort.

DETAILED DESCRIPTION

Figure 1A:
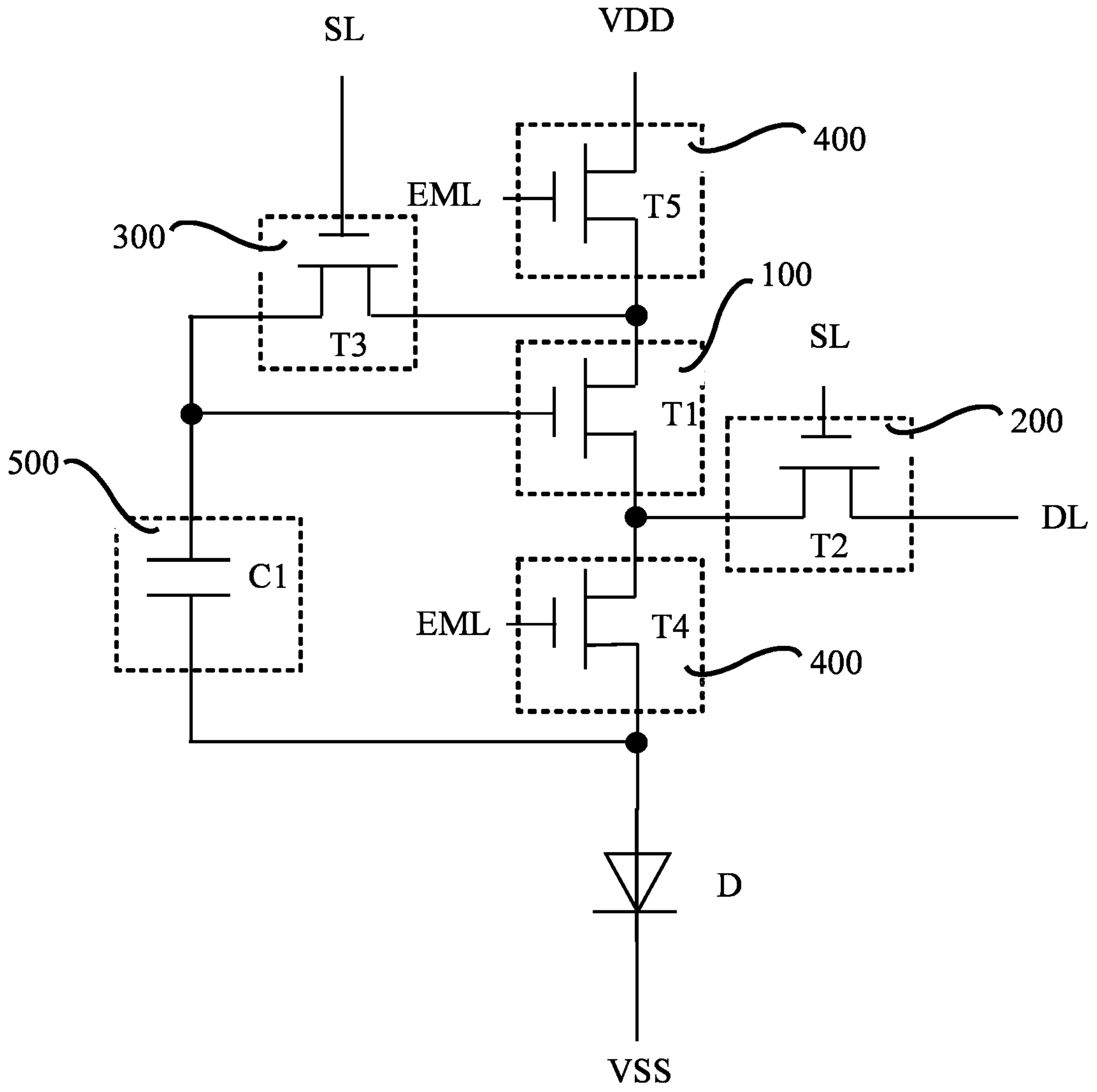
FIG. 1A-FIG. 1B are schematic structural diagrams of a pixel driving circuit according to an embodiment of the present disclosure.

The technical solution in some embodiments of the present disclosure will be described clearly and completely in conjunction with the accompanying drawings. It is apparent that the described embodiments are merely part of some embodiments of the present disclosure, not all of the embodiments. Based on some embodiments of the present disclosure, all other embodiments obtained by those skilled in the art without involving any inventive effort are within the scope of the present disclosure. Furthermore, it should be understood that the particular embodiments described herein are merely for illustrating and explaining the present disclosure and are not for limiting the present disclosure. In the present disclosure, if not stated to the contrary, the positional terms used such as “up” and “down” usually refer to up and down of the device in actual use or a working state, particularly in the drawing direction in the attached drawings. While “in” and “out” are with respect to the contour of the device.

Particularly, according to the present disclosure a driving circuit is configured to drive the light-emitting device.

Alternatively, the driving circuit may be used as a backlight driving circuit or may be used as a pixel driving circuit. Alternatively, the light-emitting device includes an organic light-emitting diode, a sub-millimeter light-emitting diode, a micro light-emitting diode, and the like.

Figure 1B:
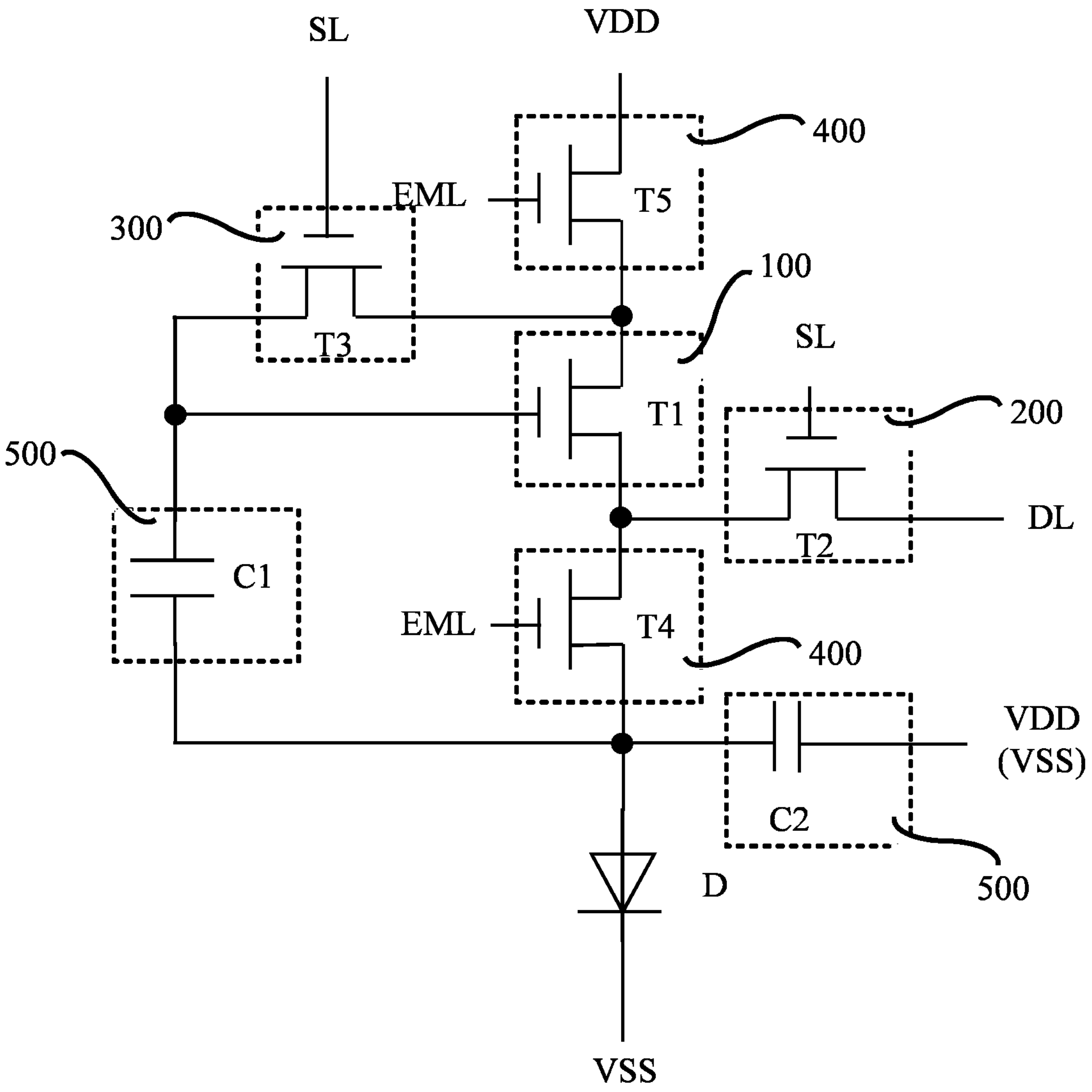

The driving circuit as a pixel driving circuit is taken as an example for explanation. Particularly, FIG. 1A-FIG. 1B are schematic structural diagrams of a pixel driving circuit according to an embodiment of the present disclosure.

According to the present disclosure, a pixel driving circuit includes a driving module 100. The driving module 100 is configured to generate a driving current for driving a light-emitting device D to emit light.

Alternatively, the driving module 100 includes a first transistor T1. The first transistor T1 and the light-emitting device D are connected in series between a first voltage terminal VDD and a second voltage terminal VSS. Alternatively, a first electrode of the first transistor T1 is electrically connected to the first voltage terminal VDD. A second electrode of the first transistor T1 is electrically connected to an anode of the light-emitting device D. The cathode of the light-emitting device D is electrically connected to the second voltage terminal VSS. The second electrode of the first transistor T1 is electrically connected to the second voltage terminal VSS via the light-emitting device D. When the first electrode of the transistor is a source, the second electrode of the transistor is a drain. When the first electrode of the transistor is a drain, the second electrode of the transistor is a source.

The pixel driving circuit further includes a data writing module 200. The data writing module 200 is configured to transmit a data signal to the second electrode of the first transistor T1 The data writing module 200 is further configured to transmit a reset signal to the anode of the light-emitting device D to realize initialization of a potential of the anode of the light-emitting device D.

Alternatively, the data writing module 200 includes a second transistor T2. A source and a drain of the second transistor T2 are electrically connected between a data line DL and the second electrode of the first transistor T1. A gate of the second transistor T2 is electrically connected to a scanning line SL. The second transistor T2 is configured to transmit a reset signal to the anode of the light-emitting device D according to a scan signal transmitted by the scanning line SL, and transmit a data signal transmitted by the data line DL to the second electrode of the first transistor T1 according to the scan signal.

Alternatively, the data line DL is used for transmitting a composite signal. The composite signal has a first level state and a second level state. The composite signal has a first voltage value in the first level state. The composite signal has a second voltage value in the second level state.

The first voltage value is less than the second voltage value. The composite signal is used as the reset signal when having the first level state. The composite signal is used as the data signal when having the second level state.

Alternatively, since the second transistor T2 is configured to transmit a reset signal to the anode of the light-emitting device D, and is configured to transmit the data signal to the second electrode of the first transistor T1, the signal transmitted by the data line DL may be generated by one signal source (i.e., one signal source generates the composite signal) or may be generated by two signal sources.

When the signal transmitted by the data line DL is generated by two signal sources, the action moments of different signals may be switched by setting a switching module, so as to prevent mutual interference between the reset signal and the data signal during the transmission, whereby the reset signal is accurately transmitted to the anode of the light-emitting device D, and the data signal is accurately transmitted to the second electrode of the first transistor T1. If the switching module includes a first switching transistor and a second switching transistor, the first switching transistor has a source and a drain electrically connected between the data line DL and a reset voltage terminal, and the second switching transistor has a source and a drain electrically connected between the data line DL and a data voltage terminal. The gate of the first switching transistor and the gate of the second switching transistor may be electrically connected to a same switch control signal line, or may be electrically connected to different switch control signal lines. When the gate of the first switching transistor and the gate of the second switching transistor are electrically connected to the same switch control signal line, in order to implement a time-sharing transmission of the reset signal and the data signal, the first switching transistor is one of a P-type transistor and an N-type transistor, and the second switching transistor is the other of the P-type transistor and the N-type transistor. The reset voltage terminal is configured to provide the reset signal, and the data voltage terminal is configured to provide the data signal. Alternatively, the data voltage terminal includes a source driving chip or the like.

The pixel driving circuit further includes a threshold voltage detection module 300. The threshold voltage detection module 300 is configured to detect a threshold voltage of the first transistor T1.

Alternatively, the threshold voltage detection module 300 includes a third transistor T3. A source and a drain of the third transistor T3 are electrically connected between the gate of the first transistor T1 and the first electrode of the first transistor T1. The gate of the third transistor T3 is electrically connected to the scanning line SL. The third transistor T3 is configured to implement detection of threshold voltage information of the first transistor T1 according to the scan signal transmitted by the scanning line SL and transmit the data signal to the gate of the first transistor.

Alternatively, the pixel driving circuit further includes a light-emitting control module 400. The light-emitting control module 400 is configured to control the moment at which the first transistor T1 generates the driving current.

Alternatively, the light-emitting control module 400 includes a fourth transistor T4. A source and a drain of the fourth transistor T4 are electrically connected between the light-emitting device D and the second electrode of the first transistor T1. A gate of the fourth transistor T4 is electrically connected to the light-emitting control line EML.

The light-emitting control module 400 further includes a fifth transistor T5. A source and a drain of the fifth transistor T5 are electrically connected between the first voltage terminal VDD and first electrode of the first transistor T1. A gate of the fifth transistor T5 is electrically connected to the light-emitting control line EML. The fourth transistor T4 and the fifth transistor T5 are configured to cause the first transistor T1 to generate the driving current according to a light-emitting control signal transmitted by the light emission control line EML.

Alternatively, the fourth transistor T4 is further configured to, according to the light-emitting control signal transmitted by the light-emitting control line EML, cause the reset signal to be transmitted to the anode of the light-emitting device D, whereby the reset signal can be accurately transmitted to the anode of the light-emitting device D, thereby realizing initialization of the potential of the anode of the light-emitting device D.

Alternatively, the moment at which the composite signal jumps from the first level state to the second level state is same as the moment at which the fourth transistor T4 jumps from an on state to an off state, whereby the data signal can be accurately transmitted to the gate of the first transistor T1.

Alternatively, to ensure that the light-emitting device D does not emit light when the potential of the anode of the light-emitting device D is reset, the first voltage value is less than a voltage value corresponding to the second voltage signal. The second voltage terminal VSS is configured to provide the second voltage signal.

Alternatively, the fifth transistor T5 is further configured to transmit a first voltage signal transmitted by the first voltage terminal VDD to the gate of the first transistor T1 according to the light-emitting control signal transmitted by the light emission control line EML, so as to initialize the potential of the gate of the first transistor T1 by using the first voltage signal transmitted by the first voltage terminal VDD.

The pixel driving circuit further includes a potential maintaining module 500. The potential maintaining module 500 is configured to maintain a potential of the gate of the first transistor T1.

Alternatively, the potential maintaining module 500 includes a first capacitor C1. The first capacitor C1 is connected in series between the gate of the first transistor T1 and the anode of the light-emitting device D.

Alternatively, with continued reference to FIG. 1B, the potential maintaining module 500 further includes a second capacitor C2. The second capacitor C2 is connected in series between the first voltage terminal VDD or the second voltage terminal VSS and the light-emitting device D. Particularly, the second capacitor C2 is connected in series between the first voltage terminal VDD or the second voltage terminal VSS and the anode of the light-emitting device D, so as to improve the stability of the potential of the anode of the light-emitting device D.

Alternatively, in practical application, a parasitic capacitance may exist between the anode of the light-emitting device D and a signal line for transmitting the second voltage signal. Therefore, in the pixel driving circuit shown in FIG. 1A, stability of the potential of the anode of the light-emitting device D in a compensation phase can be improved by the parasitic capacitance.

Alternatively, in the pixel driving circuit shown in FIG. 1B, the sum of the capacitance value of the parasitic capacitance and the capacitance value of the second capacitance C2 may be made greater than the capacitance value of the first capacitance C1, so as to better improve the stability of the potential of the anode of the light-emitting device D in the compensation phase.

Alternatively, the active layer of the first transistor T1, the active layer of the second transistor T2, the active layer of the third transistor T3, the active layer of the fourth transistor T4, and the active layer of the fifth transistor T5 may include a silicon semiconductor material, an oxide semiconductor material, or the like. Alternatively, the silicon semiconductor material includes monocrystalline silicon, polycrystalline silicon, amorphous silicon, and the like. Alternatively, the active layer is made by using a low-temperature polysilicon process. The oxide semiconductor material may include indium gallium zinc oxide (IGZO), indium gallium tin oxide (IGTO), indium gallium zinc tin oxide (IGZTO), or the like. Alternatively, the first transistor T1, the second transistor T2, the third transistor T3, the fourth transistor T4, and the fifth transistor T5 may be P-type transistors or N-type transistors.

According to the present disclosure, it is provided a driving method of the pixel driving circuit, applied to any of the above-described pixel driving circuits.

The driving method includes: in a reset phase, transmitting, by the second transistor T2, the reset signal to the anode of the light-emitting device D according to the scan signal, so as to reset the potential of the anode of the light-emitting device D; according to the scan signal, transmitting, by the third transistor T3, a first voltage signal transmitted by the first voltage terminal VDD to the gate of the first transistor T1, so as to reset the potential of the gate of the first transistor T1.

The driving method includes: in a compensation phase, according to the scan signal, transmitting, by the second transistor T2, the data signal to the second electrode of the first transistor T1, and according to the scan signal, transmitting, by the third transistor T3, the data signal to the gate of the first transistor T1.

The driving method includes: in a light-emitting phase, according to the data signal, generating, by the first transistor T1, a driving current for driving the light-emitting device D to emit light.

Figure 2:
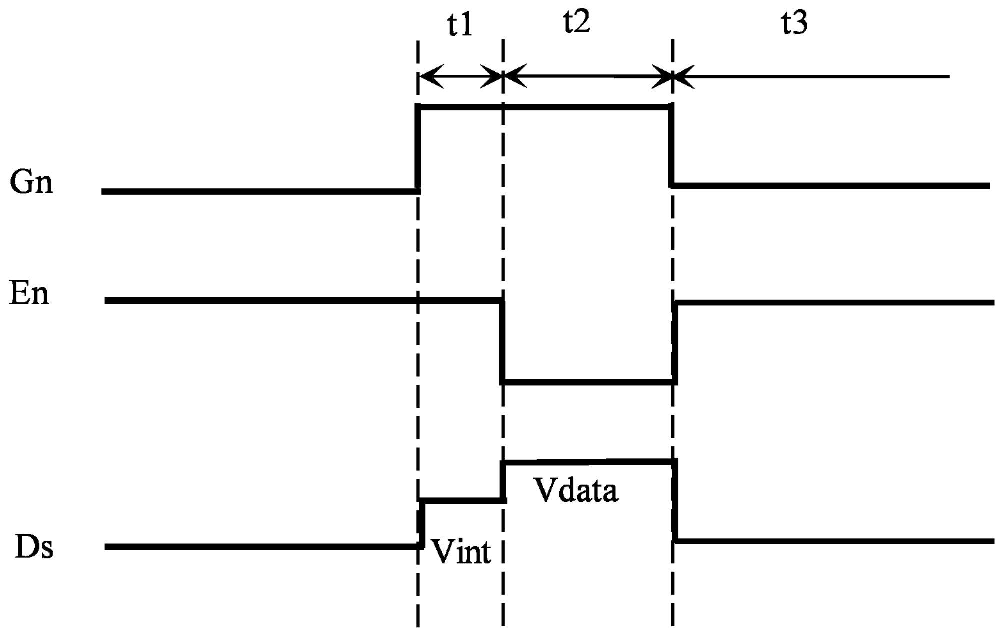
FIG. 2 is a timing diagram according to an embodiment of the present disclosure.

FIG. 2 is a timing diagram according to an embodiment of the present disclosure. The pixel driving circuit and the driving method of the pixel driving circuit shown in FIG. 1A-FIG. 1B will be described below in conjunction with the timing diagram shown in FIG. 2. That the first transistor T1, the second transistor T2, the third transistor T3, the fourth transistor T4, and the fifth transistor T5 are all N-type transistors, a source of the first transistor T1 is electrically connected to the second transistor T2, a drain of the first transistor T1 is electrically connected to the third transistor T3, and a signal transmitted by the data line DL is a composite signal Cs is taken as an example.

In the reset phase t1, a scan signal Gn transmitted by the scanning line SL is high at a high level. The light-emitting control signal En transmitted by the light emission control line EML is at a high level. The composite signal Cs transmitted by the data line DL is in a first level state. The composite signal Cs has a first voltage value in the first level state. The composite signal Cs is used as the reset signal Vint when having the first level state. The second transistor T2 and the third transistor T3 turn on in response to the scan signal Gn. The fourth transistor T4 and the fifth transistor T5 turn on in response to the light-emitting control signal En. The first voltage signal provided by the first voltage terminal VDD is transmitted to the gate of the first transistor T1 via the fifth transistor T5 and the third transistor T3, so as to reset the potential of the gate of the first transistor T1. The reset signal Vint is transmitted to the anode of the light-emitting device D via the second transistor T2 and the fourth transistor T4, so as to reset the potential of the anode of the light-emitting device D.

In the compensation stage t2, the scan signal Gn transmitted by the scanning line SL is at a high level. The light-emitting control signal En transmitted by the light emission control line EML is at a low level. The composite signal Cs transmitted by the data line DL is in a second level state. The composite signal Cs has a second voltage value in the second level state. The composite signal Cs is used as the data signal Vdata when having the second level state. The second transistor T2 and the third transistor T3 turn on in response to the scan signal Gn. The fourth transistor T4 and the fifth transistor T5 turn off. The data signal Vdata is transmitted to the source of the first transistor T1 via the second transistor T2, making the potential Vs of the source of the first transistor T1 is equal to the data signal Vdata, that is, Vs=Vdata. The third transistor T3 turns on to make the first transistor T1 is connected in a diode style. The first transistor T1 turns on, making the data signal Vdata is transmitted to the gate of the first transistor T1, until the potential Vg of the gate of the first transistor T1 is equal to the sum of the data signal Vdata and the threshold voltage Vth of the first transistor T1 (i.e., Vg=Vdata+Vth). The first transistor T1 turns off. Since the fourth transistor T4 turns off, the voltage difference between two ends of the first capacitor C1 is Vdata+Vth−Vint.

In the light-emitting phase, the scan signal Gn transmitted by the scanning line SL is at a low level. The light-emitting control signal En transmitted by the light-emitting control line EML is at a high level. The second transistor T2 and the third transistor T3 turn off. The fourth transistor T4 and the fifth transistor T5 turn on in response to the light-emitting control signal En. The fourth transistor T4 turns on to make a difference between the potential of the gate of the first transistor T1 and the potential of the source of the first transistor T1 is equal to a voltage difference between two ends of the first capacitor C1. That is, Vg−Vs=Vgs=Vdata+Vth−Vint. Accordingly, the driving current $I=k\ (Vgs-Vth)^2=k\ (Vdata-Vint)^2$, in which the driving current I is generated by the first transistor T1. Thus, the driving current I is irrelevant to the threshold voltage Vth of the first transistor T1, so as to make the driving current I to be not affected by the threshold voltage Vth of the first transistor T1. k is the current amplification factor of the first transistor T1 and is determined by the electrical characteristic of the first transistor T1 itself.

During the compensation phase t2, when the data signal Vdata is transmitted to the gate of the first transistor T1, the potential of the anode of the light-emitting device D is affected by the coupling effect of the first capacitor C1. Therefore, the second capacitor C2 for maintaining the potential of the anode of the light-emitting device D is provided in the pixel driving circuit, so as to improve the influence of the coupling effect on the potential of the anode of the light-emitting device D in the compensation phase t2, thereby improving the stability of the potential of the anode of the light-emitting device D.

According to the present application, a display panel includes any one of the above-described driving circuits. Alternatively, the display panel includes a self-light-emitting display panel, a passive light-emitting display panel, and the like. Alternatively, the display panel is a self-light-emitting display panel. The light-emitting display panel includes a light-emitting device. The driving circuit is used as a pixel driving circuit to drive the light-emitting device to emit light. Alternatively, the display panel is a passive light-emitting display panel. The display panel includes a backlight. The driving circuit is used as a backlight driving circuit to drive the backlight to emit light.

Figure 3:
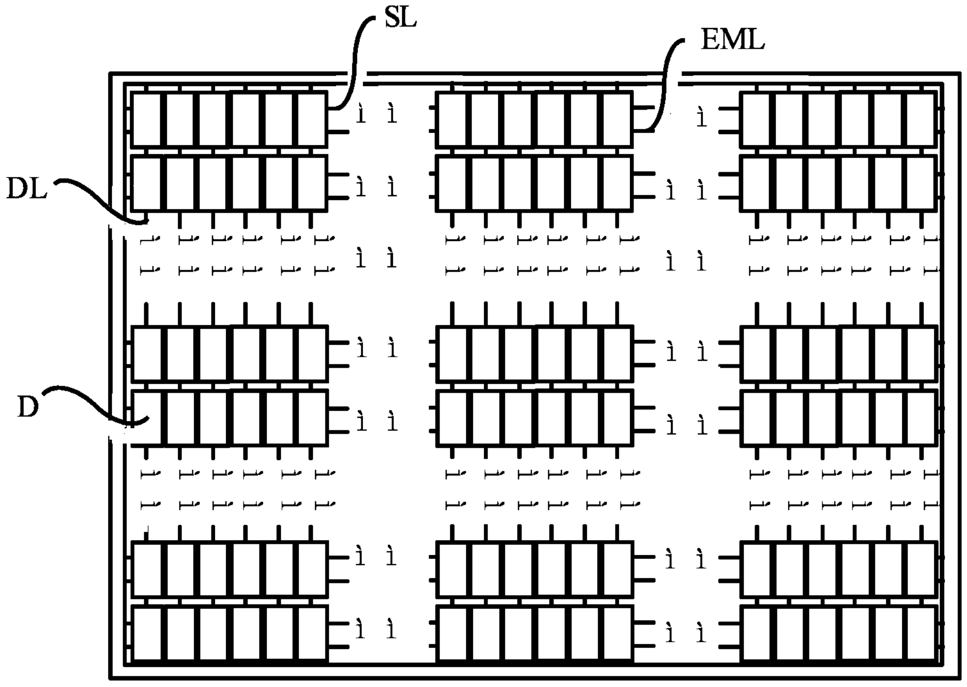
FIG. 3 is a schematic structural diagram of a display panel according to an embodiment of the present disclosure.

FIG. 3 is a schematic structural diagram of a display panel according to an embodiment of the present disclosure. According to the present application, a display panel includes multiple scanning lines SL, multiple light-emitting control lines EML, multiple data lines DL, multiple light-emitting devices D, and multiple pixel driving circuits.

Multiple scanning lines SL are used for transmitting multiple scan signals. Multiple light emission control lines are used for transmitting multiple light-emitting control signals. The multiple data lines DL are used for transmitting a composite signal. The composite signal has a first level state and a second level state. The composite signal has a first voltage value in the first level state. The composite signal has a second voltage value in the second level state. The first voltage value is less than the second voltage value.

The multiple pixel driving circuits are electrically connected to the multiple scanning lines SL, the multiple light-emitting control lines EML, and the multiple data lines DL, so as to according to the corresponding scan signal, the light-emitting control signal, and the composite signal, control the multiple light-emitting devices D to emit light.

Figure 4A:
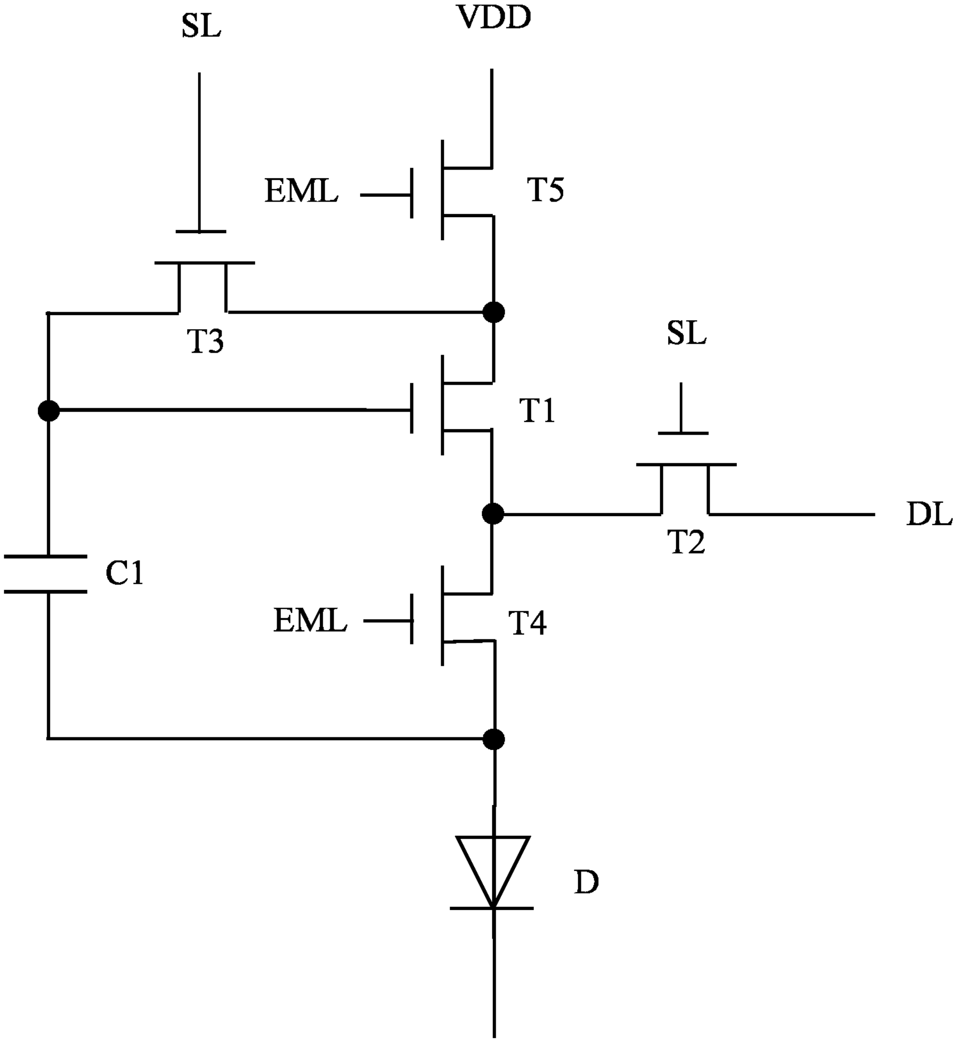
FIG. 4A-FIG. 4B are schematic structural diagrams of a pixel driving circuit according to an embodiment of the present disclosure.
Figure 4B:
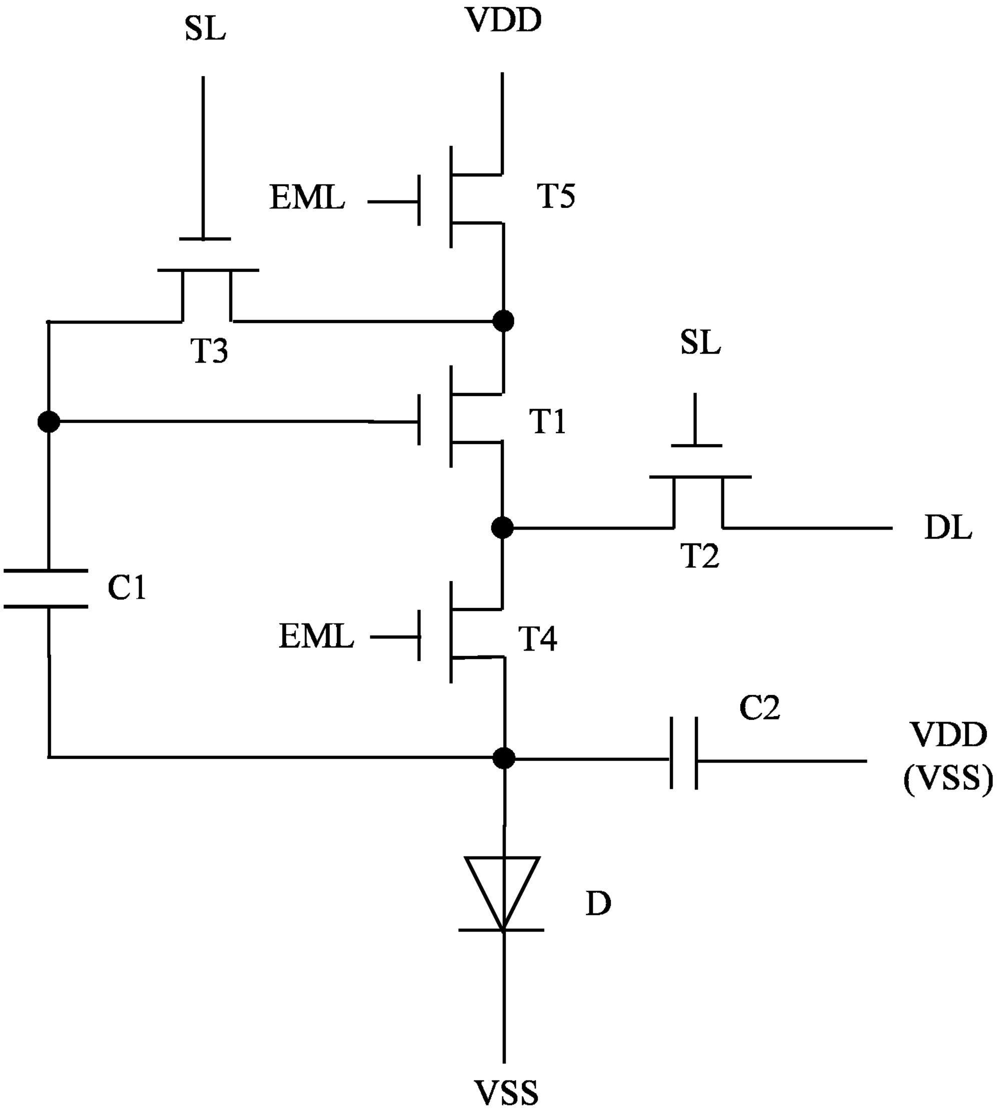

FIG. 4A-FIG. 4B are schematic structural diagrams of a pixel driving circuit according to an embodiment of the present disclosure. At least one pixel driving circuit includes a first transistor T1, a second transistor T2, a third transistor T3, a fourth transistor T4, a fifth transistor T5, and a first capacitor C1.

A first electrode of the first transistor T1 is electrically connected to the first voltage terminal VDD. A second electrode of the first transistor T1 is electrically connected to the anode of the light-emitting device D and electrically connected to the second voltage terminal VSS via the light-emitting device D. When the first electrode of the transistor is a source, the second electrode of the transistor is a drain. When the first electrode of the transistor is a drain, the second electrode of the transistor is a source.

The source and the drain of the second transistor T2 are electrically connected between the data line DL and the second electrode of the first transistor T1. The source and the drain of the third transistor T3 are electrically connected between the gate of the first transistor T1 and the first electrode of the first transistor T1. The gate of the second transistor T2 and the gate of the third transistor T3 are both electrically connected to the corresponding scanning line SL.

The source and the drain of the fourth transistor T4 are electrically connected between the light-emitting device D and the second electrode of the first transistor T1. The source and the drain of the fifth transistor T5 are electrically connected between the first voltage terminal VDD and first electrode of the first transistor T1. The gate of the fourth transistor T4 and the gate of the fifth transistor T5 are both electrically connected to the light-emitting control line EML.

The first capacitor C1 is connected in series between the gate of the first transistor T1 and the light-emitting device D.

The composite signal is used as the reset signal when having the first level state. The composite signal is used as the data signal when having the second level state. The moment at which the composite signal jumps from the first level state to the second level state is same as the moment at which the fourth transistor T4 jumps from an on state to an off state, so that the data signal can be accurately transmitted to the gate of the first transistor T1.

Particularly, in the reset phase, the second transistor T2 and the fourth transistor T4 turn on. The composite signal having the first level state is used as the reset signal to be transmitted to the anode of the light-emitting device D, so as to reset the potential of the anode of the light-emitting device D. The third transistor T3 and the fifth transistor T5 turn on. A first voltage signal provided by the first voltage terminal VDD is transmitted to the gate of the first transistor T1, so as to reset the potential of the gate of the first transistor T1.

In a compensation phase, the second transistor T2 turns on. The composite signal having the second level state is used as the data signal to be transmitted to the second electrode of the first transistor T1. The third transistor T3 turns on so that the data signal is transmitted to the gate of the first transistor T1, until the potential Vg of the gate of the first transistor T1 is equal to the sum of the data signal Vdata and the threshold voltage Vth of the first transistor T1. The first transistor T1 turns off.

In the light-emitting phase, the fourth transistor T4 and the fifth transistor T5 turn on. The difference between the potential of the gate of the first transistor T1 and the potential of the source of the first transistor T1 is equal to the voltage difference between two ends of the first capacitor C1, thereby causing the driving current $I=k\ (Vgs-Vth)^2=k\ (Vdata-Vint)^2$, in which the driving current I is generated by the first transistor T1. Thus, the influence of the threshold voltage Vth of the first transistor T1 on the driving current I.

Alternatively, during the compensation phase, the potential of the anode of the light-emitting device D may fluctuate under the influence of the coupling effect of the first capacitor C1. Therefore, to ensure the stability of the potential of the anode of the light-emitting device D during the compensation phase, at least one of the pixel driving circuits further includes a second capacitor C2. The second capacitor C2 is connected in series between the first voltage terminal VDD or the second voltage terminal VSS and the light-emitting device D.

According to the present disclosure, a display device includes a driving circuit as described above or a display panel as described above.

It is understandable that the display device includes a movable display device (such as a notebook computer, a mobile phone, and the like), a fixed terminal (such as a desktop computer, a television, and the like), a measuring device (such as a sports bracelet, a thermometer, and the like), and the like.

Herein specific examples have been applied to explain the principles and embodiments of the present disclosure. The explanation of above examples is only used for helping to understand the method of the present invention and the core idea thereof. At the same time, for those skilled in the art, there may be changes in both the particular embodiment and the application scope based on the idea of the present disclosure. In summary, the content of the present specification should not be understood as a limitation of the present disclosure.

What is claimed is:

1. A pixel driving circuit, comprising:

a first transistor, having a first electrode of the first transistor is electrically connected to a first voltage terminal and a second electrode of the first transistor is electrically connected to an anode of a light-emitting device and electrically connected to a second voltage terminal via the light-emitting device;

a second transistor, having a source and a drain electrically connected respectively to a data line and the second electrode of the first transistor, and a gate connected to a scan signal, the data line being used for transmitting a composite signal, the composite signal having a first voltage as a reset signal in a first level state during a reset phase in which a potential of the anode of the light-emitting device is reset and a potential of the gate of the first transistor is reset, and the composite signal further having a second voltage in a second level state during a compensation phase, the first voltage being less than the second voltage;

a third transistor, having a source and a drain electrically connected respectively to a gate of the first transistor and the first electrode of the first transistor;

a first capacitor having two terminals connected respectively to the gate of the first transistor and the anode of the light-emitting device; and a second capacitor having two terminals connected respectively to the first voltage terminal and the light-emitting device, or respectively to the second voltage terminal and the light-emitting device;

wherein the second voltage terminal is configured to provide a second voltage signal having a voltage greater than the first voltage;

a parasitic capacitance is generated between the anode of the light-emitting device and a signal line for transmitting the second voltage signal;

a sum of a capacitance value of the parasitic capacitance and a capacitance value of the second capacitor is greater than a capacitance value of the first capacitor;

wherein the second transistor is configured to: in the reset phase, transmit the reset signal to the anode of the light-emitting device based on the scan signal, to reset the potential of the anode of the light-emitting device so that the light-emitting device is non-conductive; and in the compensation phase, transmit the data signal to the second electrode of the first transistor based on the scan signal;

the third transistor is configured to: in the reset phase, transmit a first voltage signal transmitted by the first voltage terminal to the gate of the first transistor based on the scan signal, to reset the potential of the gate of the first transistor; and in a compensation phase, transmit the data signal to the gate of the first transistor based on the scan signal; and the first transistor is configured to: in a light-emitting phase, based on the data signal, generate a drive current for driving the light-emitting device to emit light;

wherein the pixel driving circuit further comprises:

a fourth transistor, having a source and a drain which are electrically connected respectively to the light-emitting device and the second electrode of the first transistor;

wherein a moment at which the composite signal jumps from the first level state to the second level state is same as a moment at which the fourth transistor transitions from an on state to an off state.

2. The pixel driving circuit according to claim 1, further comprising:

a fifth transistor, having a source and a drain electrically connected respectively to the first voltage terminal and the first electrode of the first transistor.

3. A driving method of a pixel driving circuit, the pixel driving circuit comprising:

a first transistor having a first electrode electrically connected to a first voltage terminal and a second electrode electrically connected to an anode of a light-emitting device and electrically connected to a second voltage terminal via the light-emitting device;

a second transistor having a source and a drain electrically connected respectively to a data line and the second electrode of the first transistor, and a gate connected to a scan signal, the data line being used for transmitting a composite signal, the composite signal having a first voltage as a reset signal in a first level state during a reset phase in which a potential of the anode of the light-emitting device is reset and a potential of the gate of the first transistor is reset, and the composite signal further having a second voltage in a second level state during a compensation phase, the first voltage being less than the second voltage;

a third transistor having a source and a drain electrically connected respectively to a gate and the first electrode of the first transistor;

a first capacitor having two terminals connected respectively to the gate of the first transistor and the anode of the light-emitting device;

a second capacitor having two terminals connected respectively to the first voltage terminal and the light-emitting device, or respectively to the second voltage terminal and the light-emitting device;

wherein the second voltage terminal is configured to provide a second voltage signal having a voltage greater than the first voltage;

a parasitic capacitance is generated between the anode of the light-emitting device and a signal line for transmitting the second voltage signal; and a sum of a capacitance value of the parasitic capacitance and a capacitance value of the second capacitor is greater than a capacitance value of the first capacitor;

the driving method comprising:

in the reset phase, transmitting, by the second transistor, the reset signal to the anode of the light-emitting device based on the scan signal, to reset the potential of the anode potential of the light-emitting device so that the light-emitting device is non-conductive; and transmitting, by the third transistor, a first voltage signal transmitted by the first voltage terminal to the gate of the first transistor based on the scan signal, to reset the potential of the gate of the first transistor;

in the compensation phase, transmitting, by the second transistor, the data signal to the second electrode of the first transistor based on the scan signal, and transmitting, by the third transistor, the data signal to the gate of the first transistor based on the scan signal; and in a light-emitting phase, based on the data signal, generating, by the first transistor, a driving current for driving the light-emitting device to emit light;

wherein the pixel driving circuit further comprises:

a fourth transistor, having a source and a drain which are electrically connected respectively to the light-emitting device and the second electrode of the first transistor;

wherein a moment at which the composite signal jumps from the first level state to the second level state is same as a moment at which the fourth transistor transitions from an on state to an off state.

4. The driving method according to claim 3, wherein the pixel driving circuit further comprises:

a fifth transistor, having a source and a drain electrically connected respectively to the first voltage terminal and the first electrode of the first transistor.

5. A display panel, comprising a plurality of pixel driving circuits and a plurality of light-emitting devices, wherein each of at least one of the plurality of pixel driving circuits comprises:

a first transistor having a first electrode electrically connected to a first voltage terminal and a second electrode electrically connected to an anode of a light-emitting device and electrically connected to a second voltage terminal via the light-emitting device;

a second transistor having a source and a drain electrically connected respectively to a data line and the second electrode of the first transistor, and a gate connected to a scan signal, the data line being used for transmitting a composite signal, the composite signal having a first voltage as a reset signal in a first level state during a reset phase in which a potential of the anode of the light-emitting device is reset and a potential of the gate of the first transistor is reset, and the composite signal further having a second voltage in a second level state during a compensation phase, the first voltage being less than the second voltage;

a third transistor having a source and a drain electrically connected respectively to a gate and the first electrode of the first transistor;

a first capacitor having two terminals connected respectively to the gate of the first transistor and the anode of the light-emitting device; and a second capacitor having two terminals connected respectively to the first voltage terminal and the light-emitting device, or respectively to the second voltage terminal and the light-emitting device;

wherein the second voltage terminal is configured to provide a second voltage signal having a voltage greater than the first voltage;

a parasitic capacitance is generated between the anode of the light-emitting device and a signal line for transmitting the second voltage signal;

a sum of a capacitance value of the parasitic capacitance and a capacitance value of the second capacitor is greater than a capacitance value of the first capacitor;

wherein the second transistor is configured to: in the reset phase, transmit the reset signal to the anode of the light-emitting device based on the scan signal, to reset the potential of the anode of the light-emitting device so that the light-emitting device is non-conductive; and in the compensation phase, transmit the data signal to the second electrode of the first transistor based on the scan signal;

the third transistor is configured to: in the reset phase, transmit a first voltage signal transmitted by the first voltage terminal to the gate of the first transistor based on the scan signal, to reset the potential of the gate of the first transistor; and in a compensation phase, transmit the data signal to the gate of the first transistor based on the scan signal; and the first transistor is configured to: in a light-emitting phase, based on the data signal, generate a drive current for driving the light-emitting device to emit light;

wherein the pixel driving circuit further comprises:

a fourth transistor, having a source and a drain which are electrically connected respectively to the light-emitting device and the second electrode of the first transistor;

wherein a moment at which the composite signal jumps from the first level state to the second level state is same as a moment at which the fourth transistor transitions from an on state to an off state.

6. The display panel according to claim 5, wherein the pixel driving circuit further comprises:

a fifth transistor, having a source and a drain electrically connected respectively to the first voltage terminal and the first electrode of the first transistor.

* * * * *